United States Patent [19]
Turgeon et al.

[11] Patent Number: 5,524,159
[45] Date of Patent: Jun. 4, 1996

[54] FIBER OPTIC CONNECTOR

[75] Inventors: Richard D. Turgeon, Dracut, Mass.;
Shelly A. Buchter, East Berlin, Pa.;
Bryan T. Edwards, Camp Hill, Pa.;
Joseph L. Kaminski, III, Harrisburg, Pa.

[73] Assignee: The Whitaker Corporation, Wilmington, Del.

[21] Appl. No.: 335,511

[22] Filed: Nov. 4, 1994

[51] Int. Cl.$^6$ .................................................. G02B 6/36
[52] U.S. Cl. ........................... 385/78; 385/56; 385/60
[58] Field of Search ............................ 385/56, 60, 66, 385/72, 75, 78, 84

[56] References Cited

U.S. PATENT DOCUMENTS

| | | | |
|---|---|---|---|
| Re. 31,515 | 2/1984 | Heldt | 350/96.21 |
| 3,790,791 | 2/1974 | Anderson | 250/227 |
| 4,413,880 | 11/1983 | Forrest et al. | 350/96.20 |
| 4,418,983 | 12/1983 | Bowen et al. | 350/96.21 |
| 4,477,146 | 10/1984 | Bowen et al. | 350/96.21 |
| 4,553,814 | 11/1985 | Bahl et al. | 350/96.21 |
| 4,603,465 | 8/1986 | Bretti et al. | 29/564.6 |
| 4,699,456 | 10/1987 | Mackenzie | 350/96.20 |
| 4,699,462 | 10/1987 | Jones | 350/96.23 |
| 4,776,740 | 10/1988 | Holton | 411/521 |
| 4,790,622 | 12/1988 | Levinson et al. | 350/96.20 |
| 4,810,053 | 3/1989 | Woith | 350/96.20 |
| 4,812,006 | 3/1989 | Osborn et al. | 350/96.21 |
| 4,813,760 | 3/1989 | Tanaka et al. | 350/96.21 |
| 4,818,057 | 4/1989 | Bruch | 350/96.20 |
| 4,832,435 | 5/1989 | Suzuki et al. | 350/96.20 |
| 4,834,603 | 5/1989 | Holton | 411/521 |
| 4,836,637 | 6/1989 | Poorman et al. | 350/96.21 |
| 4,930,856 | 6/1990 | Pelta | 350/96.2 |
| 4,998,796 | 3/1991 | Bonanni et al. | 350/96.21 |
| 5,018,822 | 5/1991 | Freismuth et al. | 350/96.20 |
| 5,052,774 | 10/1991 | Bulman et al. | 385/86 |
| 5,058,985 | 10/1991 | Davenport et al. | 385/115 |
| 5,067,733 | 11/1991 | Nagai et al. | 277/11 |
| 5,073,044 | 12/1991 | Egner et al. | 385/86 |
| 5,121,455 | 6/1992 | Palecek | 385/69 |
| 5,142,600 | 8/1992 | Ortiz, Jr. | 385/83 |
| 5,142,601 | 8/1992 | Shibata et al. | 385/86 |
| 5,185,837 | 2/1993 | Ayuta et al. | 385/81 |
| 5,193,099 | 3/1993 | Chou | 372/107 |
| 5,208,887 | 5/1993 | Grinderslev | 385/81 |
| 5,222,176 | 6/1993 | Webber et al. | 385/99 |
| 5,241,611 | 8/1993 | Gould | 385/70 |
| 5,245,683 | 9/1993 | Belenkiy et al. | 385/72 |
| 5,257,333 | 10/1993 | Nodfelt | 385/64 |
| 5,271,080 | 12/1993 | Hopper et al. | 385/76 |
| 5,276,752 | 1/1994 | Gugelmeyer et al. | 385/69 |
| 5,436,995 | 7/1995 | Yoshizawa et al. | 385/86 |

FOREIGN PATENT DOCUMENTS

0624810A2  11/1994  European Pat. Off. .

Primary Examiner—Rodney B. Bovernick
Assistant Examiner—Robert E. Wise
Attorney, Agent, or Firm—June B. Schuette

[57] ABSTRACT

A tubular body for use with an optical fiber connector, and the connector using such a tubular body. The optical fiber connector includes a coupling nut, biasing means and a retaining ring which are axially arranged on the tubular body. The coupling nut and the biasing means are retained externally on the tubular body by the retaining ring with the coupling nut being movable along the outside surface of the body and axially displaced by the biasing means. The body includes a ring attachment portion on the outside surface thereof. The ring attachment portion includes an annular groove and an annular ridge which are formed on the outside surface thereof. The annular groove is sized and dimensioned for receiving a radially applied retaining ring. The outside diameter of the attachment portion on the outside surface of the body is sized and dimensioned for receiving an axially attached retaining ring.

17 Claims, 5 Drawing Sheets

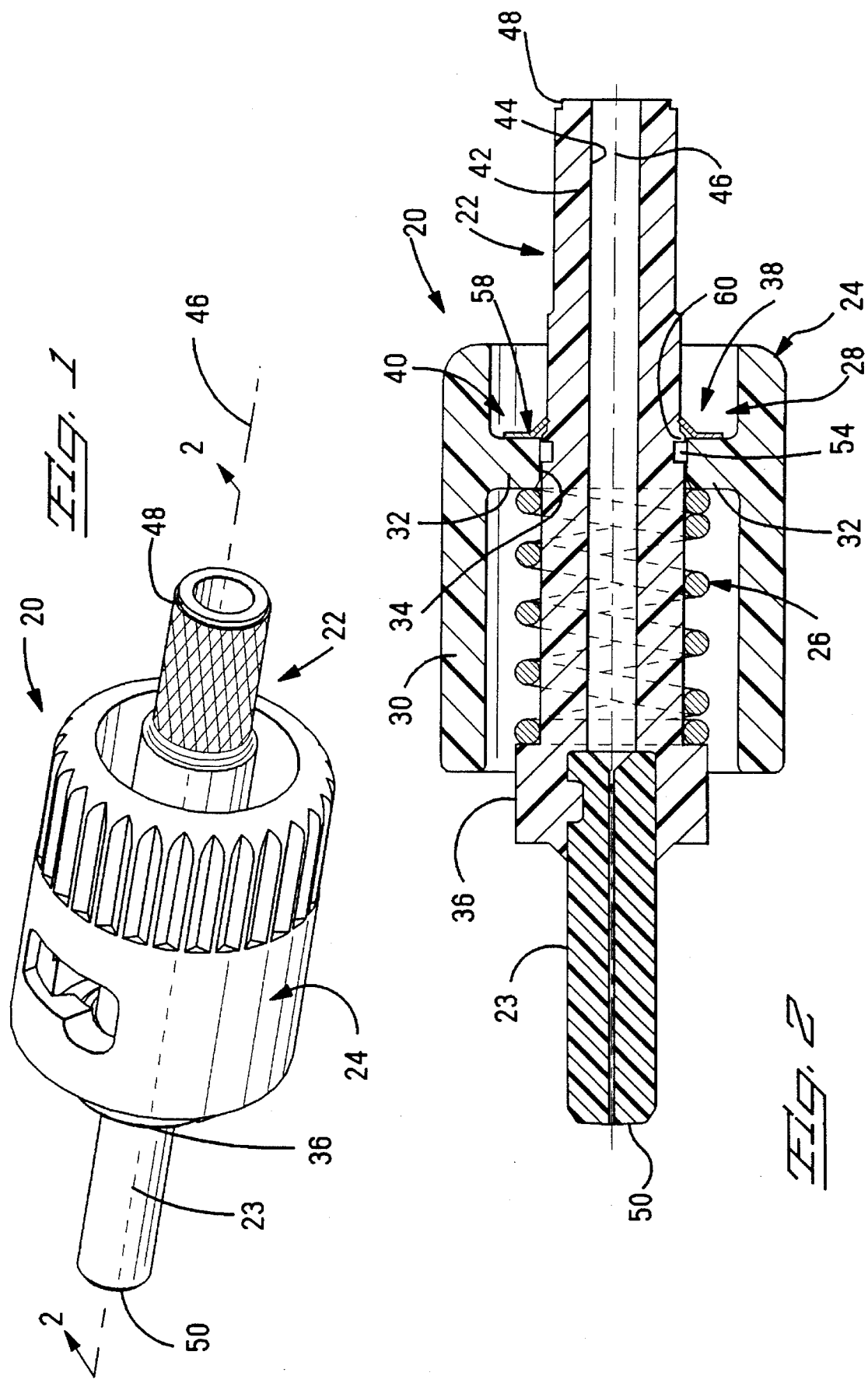

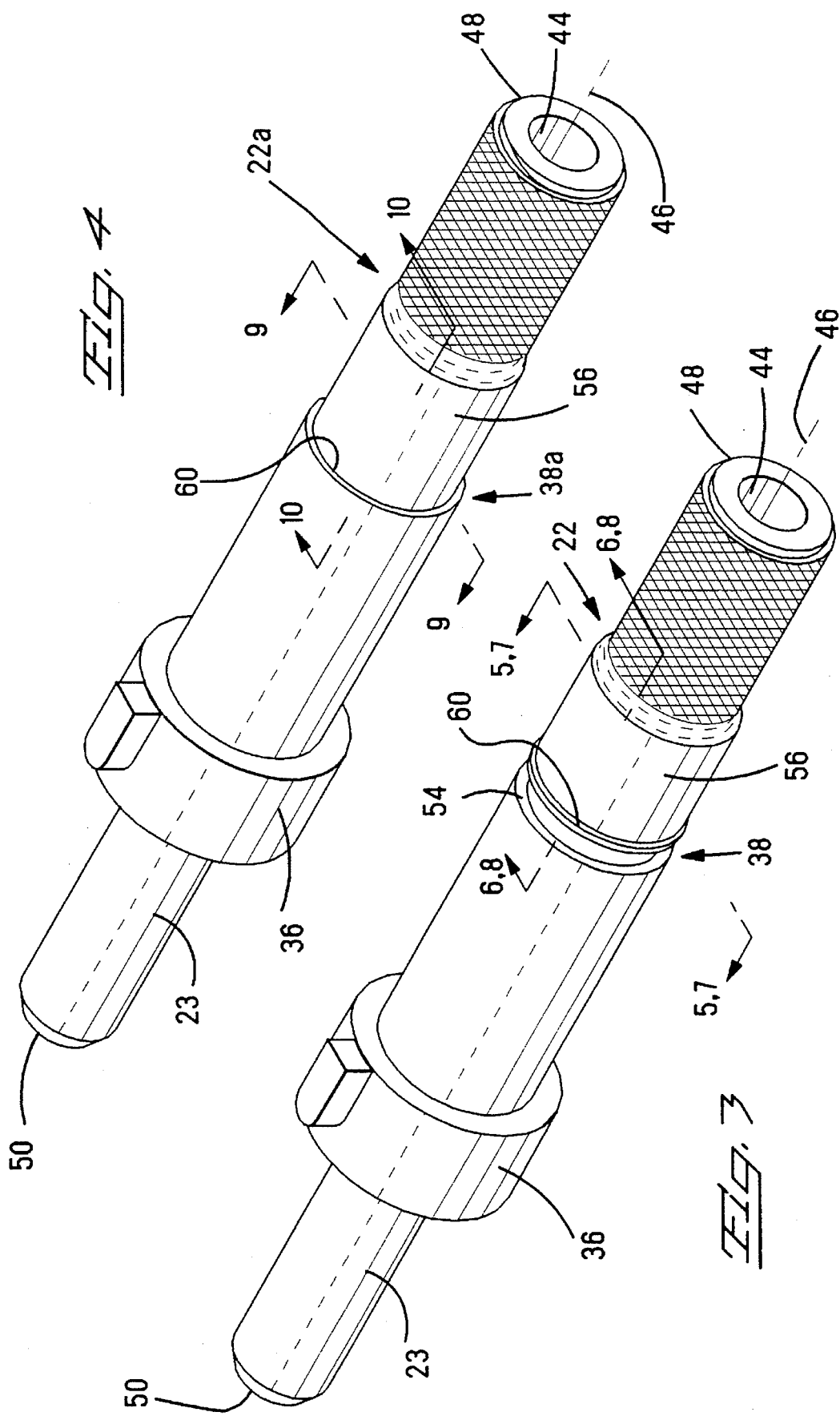

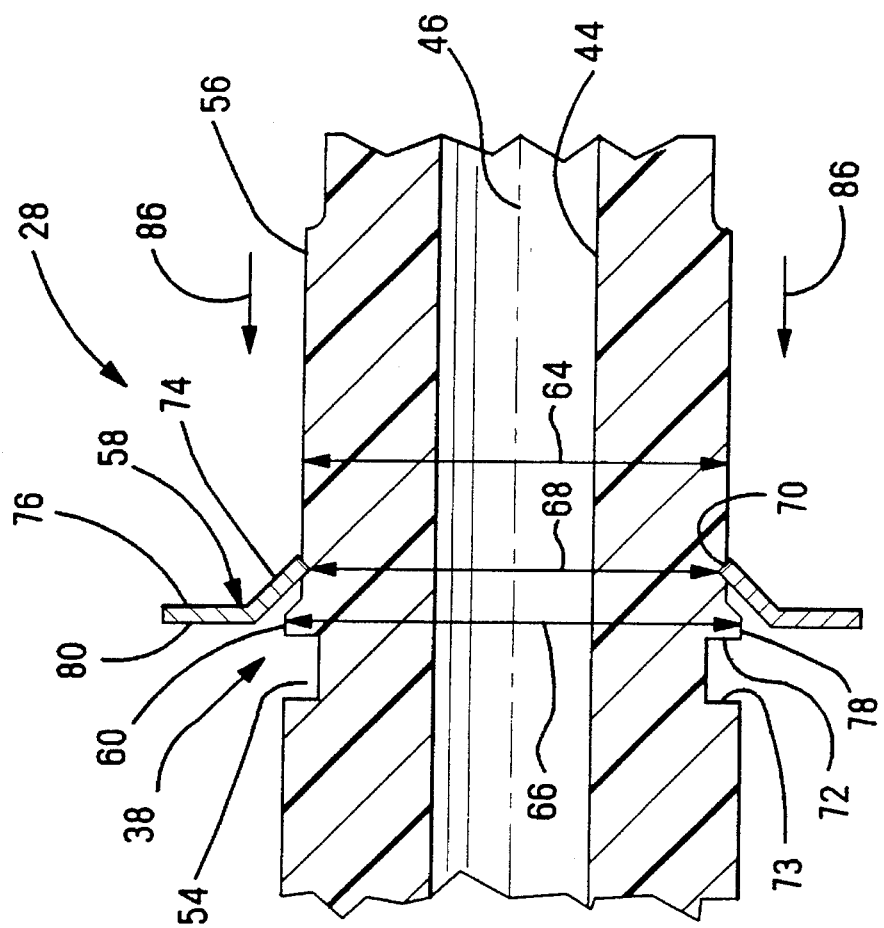
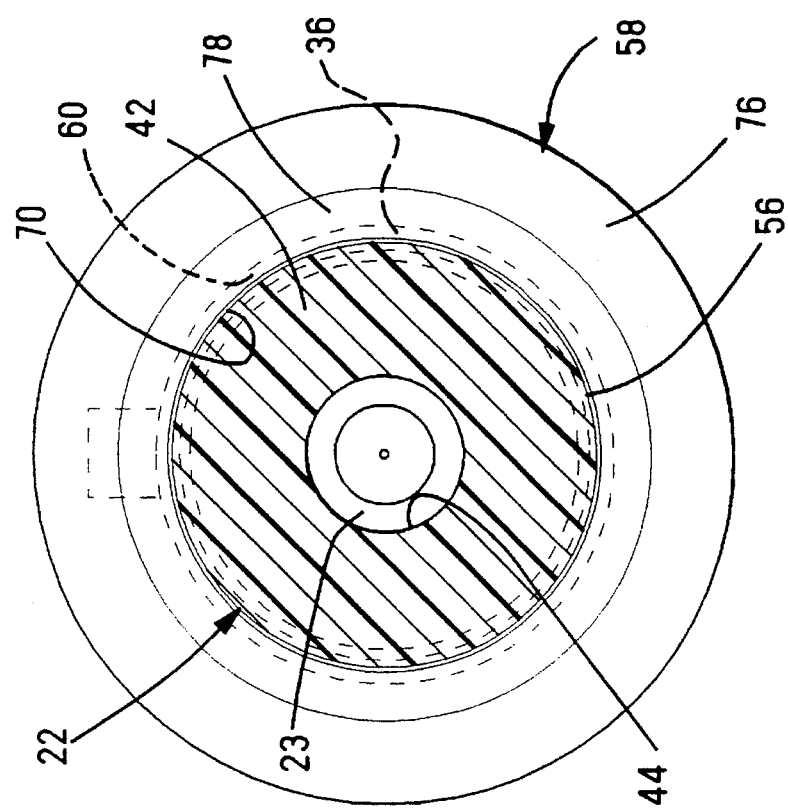

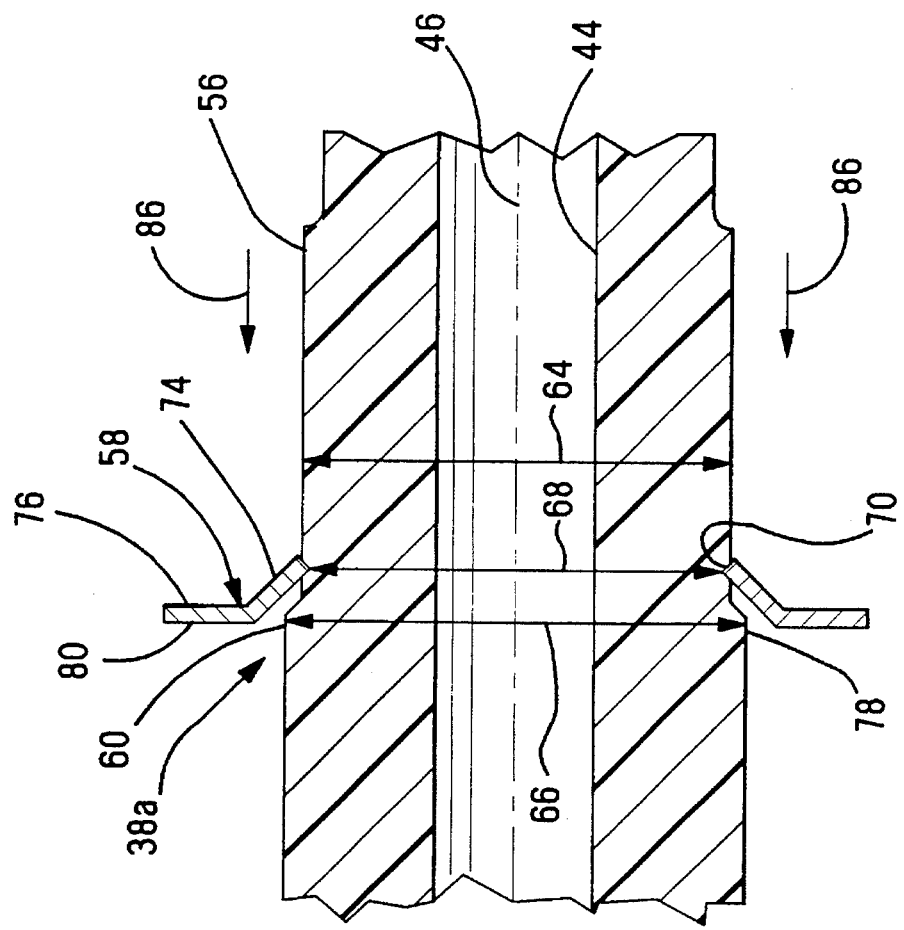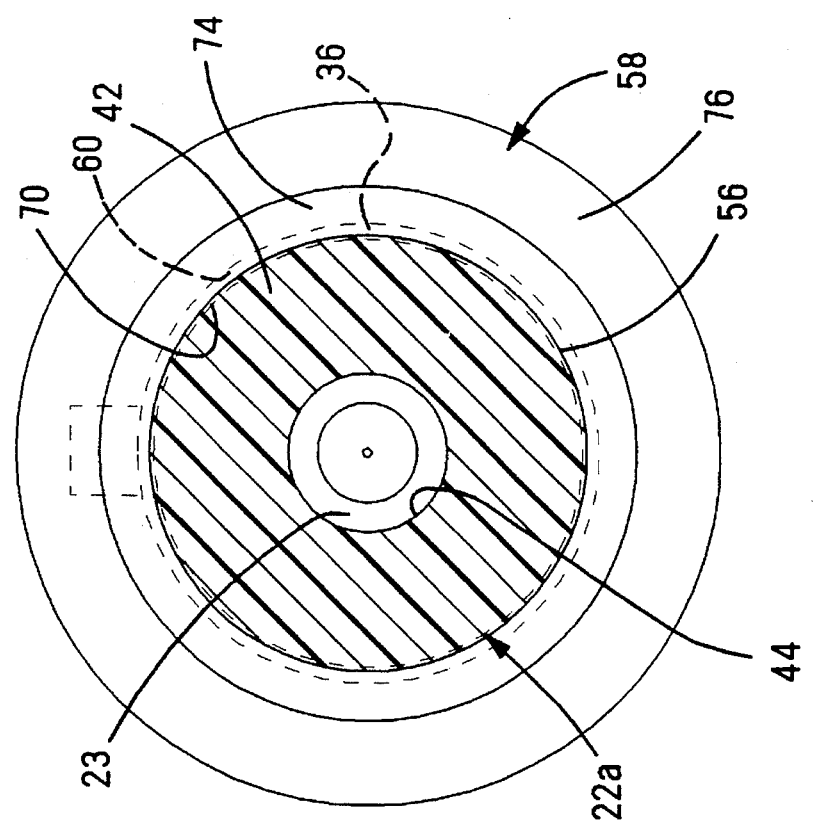

FIBER OPTIC CONNECTOR

BACKGROUND

The present invention relates to optical fiber connectors.

Optical fiber connectors are extremely important to make critical mechanical connections between the free ends of optical fibers. It is important that the connectors securely retain the connection between the two pieces of optical fiber. A variety of connectors have been developed to provide such connection. For example, U.S. Pat. No. 5,073,044 to Egner et al., issued Dec. 17, 1991, assigned to the Assignee of the present invention, shows an optical fiber connector having a right angle strain relief.

The general design of the Egner device is representative of optical fiber connectors. Such a connector includes a tubular body including a ferrule, a coupling nut, biasing means and a retaining ring. The coupling nut and biasing means are axially arranged on the tubular body and retained in position by the retaining ring. The biasing means acts against the coupling nut to provide a secure engagement with the other coupling component with which it is connected.

Typically, the retaining ring used with this type of connector is a C-ring having an open gap along one side for radial attachment to the tubular body. The C-ring is mated with an annular groove formed on an outside surface of the body. U.S. Pat. No. 5,121,455 to Palecek, issued Jun. 9, 1992, is an example of a C-ring used to retain a coupling nut and spring on the body of an optical fiber connector.

It would be desirable to provide an optical fiber connector which could be assembled using automated procedures. The C-ring retaining ring due to its radial assembly is not conducive to reliable automated assembly. However, the C-ring retaining ring, or other manual attachment procedures may be a necessary fallback assembly technique in the event of downtime of an automated assembly machine. It is important to provide the ability to use both manual and automated assembly techniques in order to maintain the required level of production output for the optical connectors.

OBJECTS AND SUMMARY

A general object satisfied by the present invention is to provide a tubular body for use with an optical fiber connector which can be assembled using an automated assembly apparatus.

Another object satisfied by the present invention is to provide a tubular body for use with an optical fiber connector which is capable of using a radially attached retaining ring or an axially attached retaining ring to secure a nut and biasing means in association with the tubular body.

Yet another object satisfied by the present invention is to provide an optical fiber connector which has increased manufacturability due to the structure of the tubular body which accommodates attachment of a retaining ring in a radial direction or an axial direction.

Briefly, and in accordance with the foregoing, the present invention envisions a tubular body for use with an optical fiber connector, and the connector using such a tubular body. The optical fiber connector includes a coupling nut, biasing means and a retaining ring which are axially arranged on the tubular body. The coupling nut and the biasing means are retained externally on the tubular body by the retaining ring witch the coupling nut being movable along the outside surface of the body and axially displaced by the biasing means. The body includes a ring attachment portion on the outside surface thereof. The ring attachment portion includes an annular groove and an annular ridge which are formed on the outside surface of the body. The groove is sized and dimensioned for receiving a radially applied retaining ring. The outside diameter of the attachment portion on the outside surface of the body is sized and dimensioned for receiving an axially attached retaining ring.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 1 is a perspective view of an optical fiber connector having a tubular body including a ferrule and a coupling nut;

FIG. 2 is a cross-sectional side elevational view taken along line 2—2 in FIG. 1 of the optical fiber connector with the tubular body, the ferrule, the coupling nut, biasing means and a retaining ring axially arranged on the tubular body with the coupling nut and the biasing means being retained on the tubular body by the retaining ring;

FIG. 3 is a perspective view of the tubular body and ferrule having an intermediate annular groove and an annular ridge on the outside surface of the tubular body as viewed from the end through which an optical fiber enters the tubular body;

FIG. 4 is a perspective view of the tubular body and ferrule having only an annular ridge on the outside surface of the tubular body as viewed from the end through which an optical fiber enters the tubular body;

FIG. 7 is a cross-sectional end view taken along line 7—7 in FIG. 3 and in which a retaining ring has been axially applied to an outside surface of the tubular body;

FIG. 8 is a partial fragmentary, cross-sectional, side elevational view taken along line 8—8 in FIG. 3 showing the retaining ring engaged with the tubular body and abutting the annular ridge formed between the annular groove and the optical fiber entry end;

FIG. 9 is a cross-sectional end view taken along line 9—9 in FIG. 4 and in which a retaining ring has been applied to an outside surface of the tubular body; and FIG. 10 is a partial fragmentary, cross-sectional, side elevational view taken along line 10—10 in FIG. 4 showing the retaining ring engaged with the tubular body and adjacent the annular ridge formed on the outside surface of the tubular body.

DETAILED DESCRIPTION OF THE PREFERRED EMBODIMENT

Figure 6:
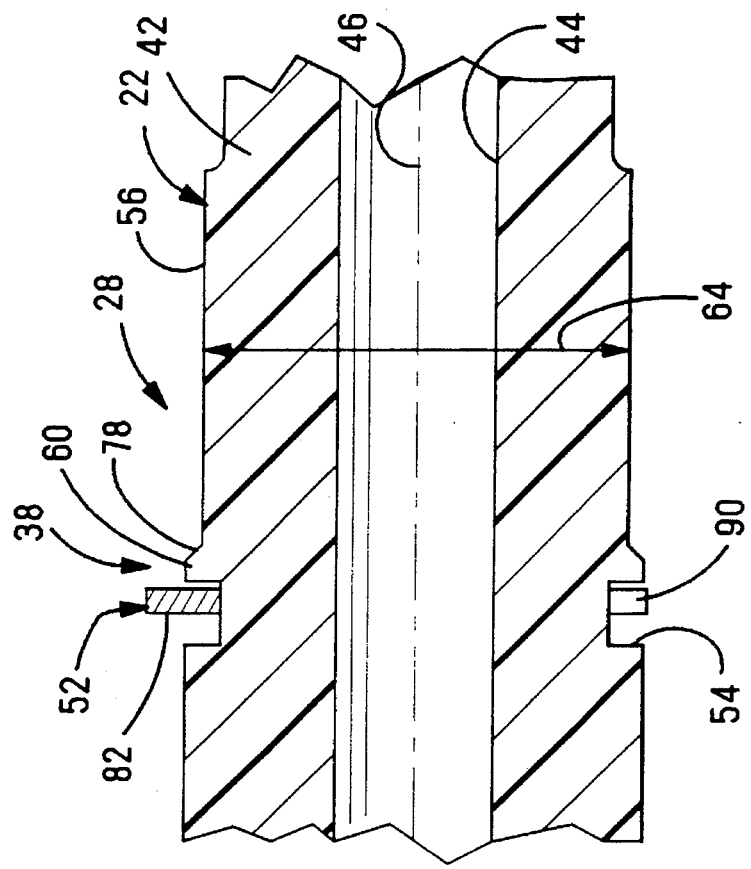
FIG. 6 is a partial fragmentary, cross-sectional, side elevational view taken along line 6—6 in FIG. 3 showing the C-ring retained in the annular groove.

While the invention may be susceptible to embodiment in different forms, there is shown in the drawings, and herein will be described in detail, embodiments with the understanding that the present description is to be considered an exemplification of the principles of the invention and is not intended to limit the invention to that as illustrated and described herein.

With reference to FIG. 1, an optical fiber connector 20 is shown and includes a tubular body 22, a ferrule 23 connected to the tubular body 22 and a coupling nut 24. FIG. 2 shows the optical fiber connector 20 in cross-section to further illustrate the arrangement of the tubular body 22 and coupling nut 24 and showing biasing means 26 and retaining means 28 of the connector 20 which are not shown in the perspective view of FIG. 1. Preferably, the tubular body 22 is formed of plastic material which is overmolded on the ferrule 23. Alternatively, the tubular body 22 and the ferrule 23 can be integrally molded or machined out of metal. The coupling nut 24 has a generally cylindrical nut body 30 with transversely projecting inner flanges 32 which define a bore 34. The tubular body 22 extends through the bore 34 with the biasing means 26 retained between the flanges 32 and a shoulder 36 formed on the tubular body 22.

The coupling nut 24 and biasing means 26 are retained on the tubular body 22 with the biasing means 26 in compression by the retaining means 28. The retaining means 28 includes a retaining means attachment zone 38 formed on an outside surface of the tubular body 22 and a coupling nut retaining means 40 mounted on the tubular body 22 in the retaining means attachment zone 38. The retaining means attachment zone 38 is configured to accommodate a retaining ring which is either radially attached as well as a retaining ring which is axially attached to the tubular body 22. It should be noted that it is generally expected that a radially attached retaining ring and an axially attached retaining ring will be used independently and not applied to the same body.

The tubular body 22 includes a wall 42 which defines a central elongated lumen 44. A central axis 46 extends coaxially through the lumen 44 along the direction of elongation of the tubular body 22. One end of the tubular body 22 defines an optical fiber entry end 48 with the opposite end of the tubular body 22 mating with the ferrule 23 defining an optical fiber connecting end 50. An optical fiber (not shown) placed in the connector 20 extends through the entry end 48 of the tubular body, through the lumen 44, through the ferrule 23 and through the connecting end 50. The ferrule 23 precisely aligns the optical fiber with a corresponding fiber retained in a mating connector ferrule (not shown).

Figure 5:
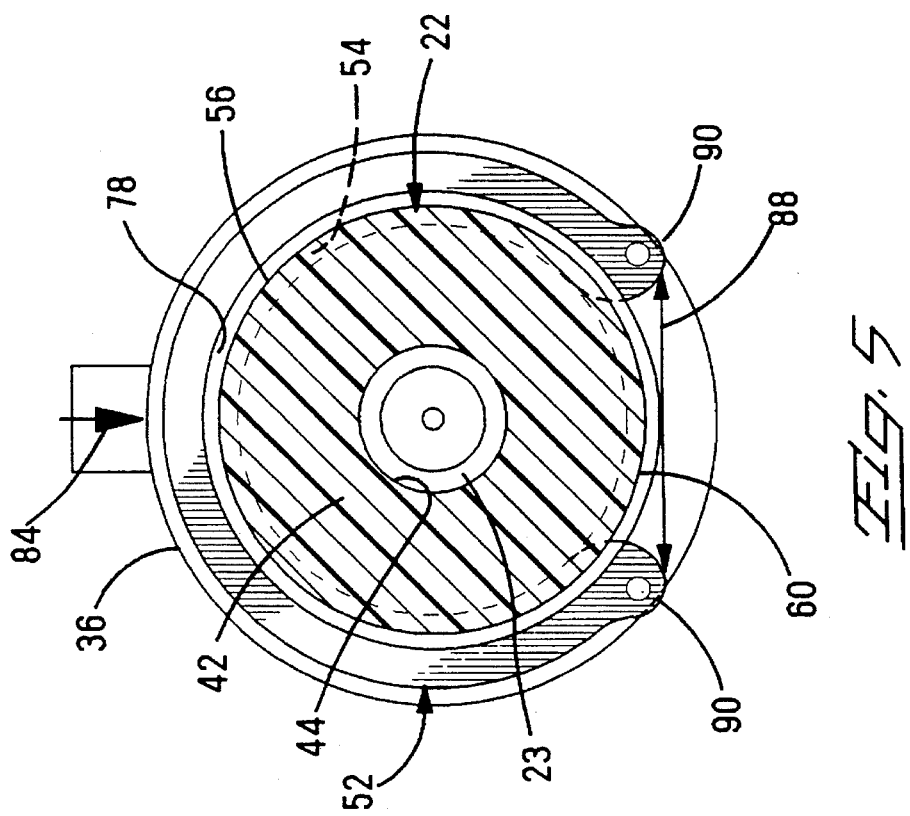
FIG. 5 is a cross-sectional end view taken along line 5—5 in FIG. 3 of the tubular body and on which a C-ring has been applied to the annular groove formed on an outside surface of the tubular body.

As mentioned above, and with further reference to FIG. 3, the tubular body 22 includes a retaining means attachment zone 38. The retaining means attachment zone 38 accommodates either a radially attached retaining ring or an axially attached retaining ring. An example of a radially attached retaining ring is shown in FIG. 5 and 6 by a C-ring 52 which is engaged in an annular groove 54 formed on an outside surface 56 of the wall 42 of the tubular body. An example of an axially attached retaining ring is the continuous annular retaining ring or retaining ring 58 shown in FIGS. 7 and 8. The retaining ring 58 is axially positioned over the outside surface 56 of the tubular body 22 in close spacing next to an annular ridge 60 which radially projects from the wall 42 of the tubular body 22.

As can be seen more clearly in the enlarged partial fragmentary, cross-sectional, side elevational views of FIGS. 6 and 8, the retaining means attachment zone 38 on the tubular body 22 includes both the annular groove 54 and the annular ridge 60. The annular groove and annular ridge 54,60 are positioned on the tubular body towards the fiber entry end 48. As shown in FIGS. 6 and 8, the annular ridge 60 is formed between the groove 54 and the entry end 48. The position of the annular ridge 60 provides positive locating of the retaining ring 58 and generally limits the axial placement of such a retaining ring 58.

With further reference to FIGS. 6 and 8, it can be seen that the first diameter 64 of the tubular body is less than a second diameter 66 of the tubular body 22 measured between the outside surfaces of the annular ridge 60. The difference between the diameters 64,66 allows the retaining ring 58 to be positively positioned and engaged on the outside surface 56 of the wall 42 in an area of the retaining means attachment zone 38 having a diameter generally equal to the first diameter 64.

It should also be noted, that the inside diameter 68 of the retaining ring 58 shown in the figures is slightly smaller than the first outside diameter 64 of the tubular body 22. This is so that there is a friction fit between an inside edge 70 of the retaining ring 58 and the first outside surface 56 of the wall 42. In fact, when the retaining ring 58 is attached to the tubular body the inside edge 70 tends to scuff or scive the outside surface 56 which increases the frictional fit between the retaining ring and the tubular body. Additionally, the retaining means attachment zone 38 may be formed with the annular ridge 60 forming one wall 72 of the walls 72,73 defining the annular groove 54. This feature allows the structures different retaining rings to be positioned in approximately the same location with very little axial difference between the two different types of rings.

With regard to the retaining ring 58 as shown in FIGS. 2 and 7-10, the retaining ring 58 includes an inner rim portion 74 and an outer flange portion 76. The inner rim portion 74 is formed at an angle relative to the central axis 46. The annular ridge 60 is formed with an approximately corresponding chamfer 78. The angle or offset structure created by the angled inner rim portion 74 of the retaining ring 58 helps to minimize the axial differential distance between the surfaces 80 on the friction fitting ring and a corresponding surface 82 on the C-ring, which surfaces are abutted by the inner flange 32 of the nut 30. By minimizing the axial differential distance between the surfaces 80,82, the biased location of the nut 30 is almost identical regardless of the type of coupling nut retaining means 40 which is used.

In use, the C-ring 52 is attached in a radial direction (as indicated by arrow 84 in FIG. 5) whereas the retaining ring 58 is attached in an axial direction (as shown by direction arrow 86 in FIG. 8). The C-ring 52 is positioned into the groove 54 by positioning the C-ring 52 in alignment with the annular groove 54 of the tubular body 22 between a gap 88 defined between opposed open ends 90 of the C-ring 52. The C-ring 52 is pressed towards the annular groove 52 so that the opposed ends 90 deflect, momentarily, slightly outwardly to allow the body to pass therebetween whereupon the C-ring engages the groove.

The retaining ring 58, on the other hand, being a solid circular ring, is conducive to automated application in the axial direction 86. The tubular body 22 is oriented to project through an aperture 68 defined between the inside edge 70 of the inner rim portion 74 of the retaining ring 58. A force is applied to the retaining ring 58 in the axial direction 86.

With reference to FIGS. 4, 9 and 10, the elements of the structure which are identical to those as shown in FIGS. 1–3 and 5–8 are identified with the same reference numeral whereas alternate forms of the structure are shown with a corresponding reference numeral with the addition of an alphabetic suffix. As shown in FIGS. 4, 9 and 10, the tubular body 22a includes a retaining means attachment zone 38a. The retaining means attachment zone 38a does not accommodate a radially attached retaining ring and only accommodates an axially attached retaining ring. The axially attached retaining ring 58 is the solid annular friction fitting retaining ring 58 as shown in FIGS. 7 and 8. The retaining ring 58 is axially positioned over the outside surface 56 of the tubular body 22a in close spacing next to the ridge 60. The ridge 60 as shown in FIGS. 4, 9 and 10 is an increased diameter portion of the body 22a as will be described in greater detail hereinbelow. The retaining means attachment zone 38a on the tubular body 22a is positioned towards the entry end 48 and includes the ridge 60.

A first diameter 64 of the tubular body 22a is less than a second diameter 66 of the tubular body 22a measured between the outside surfaces of the ridge 60. The inside diameter 68 of the retaining ring 58 is slightly smaller than the first outside diameter 64 of the tubular body 22a. The dimensional difference between the inside diameter 68 of the retaining ring 58 and the outside diameter of the tubular body 22a provides a friction fit between an inside edge 70 of the retaining ring 58 and the outside surface 56 of the wall 42. When the retaining ring 58 is attached to the tubular body the inside edge 70 tends to scuff or scive the outside surface 56 which increases the frictional fit between the retaining ring and tubular body. The differences between the diameters 64, 66 allows the retaining ring 58 to be positively positioned and engaged on the outside surface 56 of the wall 42 in the retaining means attachment zone 38a.

While a preferred embodiments of the present invention is shown and described, it is envisioned that those skilled in the art may devise various modifications of the present invention without departing from the spirit and scope of the appended claims. The invention is not intended to be limited by the foregoing disclosure.

The invention claimed is:

1. An optical fiber connector comprising:

an axially elongated ferrule connected to and communicating with a tubular body, said tubular body defining a central elongated lumen, said tubular body defining a central axis extending through said lumen, said tubular body having an optical fiber entry end and said ferrule having an optical fiber connecting end;

a coupling nut operatively associated with said tubular body, said tubular body extending through said coupling nut, said coupling nut being moveable along said central axis relative to said tubular body;

biasing means positioned between said tubular body and said coupling nut; and retaining means in fixed engagement with an outside surface of said tubular body between said optical fiber entry end and said coupling nut, said retaining means being configured for axial attachment to said tubular body, said retaining means abutting said coupling nut for retaining said biasing means in compression between said coupling nut and said tubular body.

2. An optical fiber connector as recited in claim 1, further comprising said tubular body having an annular ridge formed on said outside surface between said optical fiber entry end and said fiber connecting end of said ferrule.

3. An optical fiber connector as recited in claim 1, said tubular body further comprising a radially extending shoulder formed on said outside surface of said tubular body between said retaining means and said optical fiber connecting end of said ferrule, said shoulder being sized and dimensioned for abutting a first end of said biasing means to prevent movement of said biasing means along said outside surface of said tubular body toward said optical fiber connecting end.

4. An optical fiber connector as recited in claim 3, said biasing means is a coiled spring retained in compression between said coupling nut and said radially extending shoulder.

5. An optical fiber connector comprising:

an axially elongated ferrule connected to and communicating with a tubular body, said tubular body defining a central elongated lumen, said tubular body defining a central axis extending through said lumen, said tubular body having an optical fiber entry end and said ferrule having an optical fiber connecting end;

a coupling nut operatively associated with said tubular body, said tubular body extending through said coupling nut, said coupling nut being moveable along said central axis relative to said tubular body;

biasing means positioned between said tubular body and said coupling nut;

retaining means attached to said tubular body and abutting said coupling nut for retaining said biasing means in compression between said coupling nut and said tubular body; and a retaining means attachment zone located on an outside surface of said tubular body between said optical fiber entry end and said optical fiber connecting end, said retaining means attachment zone accepting a radially attached retaining means and an axially attached retaining means on said tubular body.

6. An optical fiber connector as recited in claim 5, said retaining means attachment zone including said outside surface of said tubular body having an annular groove formed therein.

7. An optical fiber connector as recited in claim 5, said retaining means attachment zone including an annular ridge formed on said outside surface of said tubular body.

8. An optical fiber connector as recited in claim 5, said retaining means attachment zone including an annular ridge formed on said outside surface of said tubular body and said outside surface of said tubular body having an annular groove formed therein.

9. An optical fiber connector as recited in claim 5, said tubular body further comprising a radially extending shoulder formed on said outside surface of said tubular body between said retaining means attachment zone and said optical fiber connecting end of said ferrule, said shoulder being sized and dimensioned for abutting a first end of said biasing means to prevent movement of said biasing means along said outside surface of said tubular body toward said optical fiber connecting end.

10. An optical fiber connector as recited in claim 9, said biasing means is a coiled spring retained in compression between said coupling nut and said radially extending shoulder.

11. An optical fiber connector comprising:

an axially elongated tubular body, a wall of said tubular body defining a central elongated lumen, said tubular body defining a central axis extending through said lumen, said tubular body having an optical fiber entry end;

a coupling nut operatively associated with said tubular body extending through said coupling nut, said coupling nut being moveable along said central axis relative to said tubular body;

biasing means positioned between said tubular body and said coupling nut;

a retaining ring for retaining said coupling nut on said tubular body and for retaining said biasing means in compression between said coupling nut and said tubular body; and a ring attachment portion on said tubular body for providing an attachment site for said retaining ring, said ring attachment portion including an annular groove and an outside surface of said tubular body, wherein, said retaining ring comprises;

one ring of a group of retaining rings including a C-ring and a generally continuous ring;

said C-ring of said group of retaining rings being radially attachable to said tubular body, said C-ring being engageable with said annular groove; and said generally continuous ring of said group of retaining rings being axially positionable on said outside surface of said tubular body.

12. An optical fiber connector as recited in claim 11, said generally continuous ring having an internal diameter being less than a maximum outside diameter of said wall of said tubular body in an area between said annular ridge and said optical fiber entry end.

13. An optical fiber connector as recited in claim 11, wherein said generally continuous ring has an inner rim portion and an outer flange portion, said inner rim portion being formed at an angle relative to said outer flange portion.

14. An optical fiber connector as recited in claim 13, wherein a side of said annular ridge facing said optical fiber entry end is formed at an angle relative to said central axis, said inner rim portion of said generally continuous ring being formed at an angle corresponding to said angled side of said annular ridge.

15. An optical fiber connector comprising:

an axially elongated tubular body, a wall of said tubular body defining a central elongated lumen, said tubular body defining a central axis extending through said lumen, said tubular body having an optical fiber entry end;

a coupling nut operatively associated with said tubular body with said tubular body extending through said coupling nut, said coupling nut being moveable along said central axis relative to said tubular body;

a coiled spring positioned between said tubular body and said coupling nut;

a retaining ring attached to said tubular body at a position located between said optical fiber entry end and said coupling nut for retaining said coiled spring in compression between said coupling nut and said tubular body; and an outside surface of said wall having an annular groove formed therein and an annular ridge projecting therefrom, said annular groove and annular ridge being closely spaced on said outside surface of said wall spaced away from said optical fiber entry end, said annular groove being configured for receiving and retaining a radially attached retaining ring and said annular ridge limiting the axial placement of an axially attached retaining ring.

16. An optical fiber connector as recited in claim 15 further comprising said annular ridge being spaced between said annular groove and said optical fiber entry end of said tubular body.

17. An optical fiber connector comprising:

an axially elongated tubular body, a wall of said tubular body defining a central elongated lumen, said tubular body defining a central axis extending through said lumen, said tubular body having an optical fiber entry end;

a coupling nut operatively associated with said tubular body with said tubular body extending through said coupling nut, said coupling nut being moveable along said central axis relative to said tubular body;

a coiled spring positioned between said tubular body and said coupling nut;

a retaining ring attached to said tubular body at a position located between said optical fiber entry end and said coupling nut for retaining said coiled spring in compression between said coupling nut and said tubular body; and an outside surface of said wall having an annular ridge projecting therefrom, said annular ridge being positioned on said outside surface of said wall between said optical fiber entry end and said biasing means connecting end, said annular ridge limiting the axial placement of an axially attached retaining ring.

* * * * *